(12) United States Patent
Moore et al.

(10) Patent No.: US 8,868,424 B1
(45) Date of Patent: Oct. 21, 2014

(54) INTERACTIVE VOICE RESPONSE DATA COLLECTION OBJECT FRAMEWORK, VERTICAL BENCHMARKING, AND BOOTSTRAPPING ENGINE

(75) Inventors: Michael J. Moore, Omaha, NE (US); Edgar J. Leon, Omaha, NE (US); Michelle Mason Winston, Omaha, NE (US); Nancy Bergantzel, Omaha, NE (US); Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 1226 days.

(21) Appl. No.: 12/028,093

(22) Filed: Feb. 8, 2008

(51) Int. Cl.
*G01L 21/00* (2006.01)

(52) U.S. Cl.
USPC ........ 704/270.1; 704/277; 704/270; 704/260; 704/257; 704/251; 704/235; 704/231; 704/200; 713/2; 379/265.11

(58) Field of Classification Search
CPC ... G10L 15/22; G10L 15/063; G10L 15/1815; G10L 15/265; G10L 13/027; H04M 3/5233; G06F 8/34
USPC .............. 704/235, 270, 257, 251, 277, 270.1, 704/260, 231, 200; 46/235, 270; 713/2; 379/265.11
See application file for complete search history.

(56) References Cited

U.S. PATENT DOCUMENTS

| | | | | |
|---|---|---|---|---|
| 5,566,272 | A * | 10/1996 | Brems et al. | 704/231 |
| 5,860,002 | A * | 1/1999 | Huang | 713/2 |
| 6,144,938 | A * | 11/2000 | Surace et al. | 704/257 |
| 6,173,266 | B1 * | 1/2001 | Marx et al. | 704/270 |
| 6,321,198 | B1 * | 11/2001 | Hank et al. | 704/270 |
| 7,023,979 | B1 * | 4/2006 | Wu et al. | 379/265.11 |
| 7,136,816 | B1 * | 11/2006 | Strom | 704/260 |
| 7,451,089 | B1 * | 11/2008 | Gupta et al. | 704/270.1 |
| 7,869,998 | B1 * | 1/2011 | Di Fabbrizio et al. | 704/251 |
| 8,126,717 | B1 * | 2/2012 | Strom | 704/260 |
| 2002/0032564 | A1 * | 3/2002 | Ehsani et al. | 704/235 |
| 2002/0035474 | A1 * | 3/2002 | Alpdemir | 704/270 |
| 2003/0200080 | A1 * | 10/2003 | Galanes et al. | 704/200 |
| 2005/0033582 | A1 * | 2/2005 | Gadd et al. | 704/277 |

* cited by examiner

*Primary Examiner* — Michael Colucci

(57) ABSTRACT

A method, a system, and computer readable medium comprising instructions for analyzing data of a speech application are provided. The method comprises defining a set of data collection objects for a call flow in a speech application, collecting data using the set of data collection objects during execution of the speech application, and analyzing the data using a benchmarking and bootstrapping engine, storing the data in a repository, and presenting the data for analysis.

25 Claims, 18 Drawing Sheets

Figure 5

| Attributes | Comments |
|---|---|
| 502 Date and time | Date and time of the initiation of the application |
| 504 Server | Server on which the application is running |
| 506 Client Identification | The name of the client |
| 508 Application Identification | The name or identification string for the application |

```
510
DOC.ApInit = {
    TimeStamp = 20070806101702; 502
    DOCId = Client.Application.ApInit.001;
    Server = 192.139.29.33; 504
    Client Identification = Client Name; 506
    Application Identification = Main Menu; 508
512
}
```

Figure 6

| Attributes | Comments |
|---|---|
| 602 Date and time | Date and time of the initiation of the call |
| 604 Server | Server on which the application is running |
| 606 Line | Line where the call came in |
| 608 Application Identification | The name or identification string for the application |
| 610 ANI | Call origination point identification number |
| 612 Call Id | Call Identification |

```
       614
DOC.CallInit = {
    TimeStamp = 20070806101702;602
    DOCId = Client.Application.CallInit.001; 616
    Server = 192.192.192.192;604
    Line = 34; 606
    Application Identification = Main Menu 608
    ANI = 402-555-3212;610
    Call Id = c.384302.aax.393;612
}
```

Figure 7

| Attributes | Comments |
|---|---|
| 702 Date and time | Date/Time stamp |
| 704 Dialog State Id | Dialog State Id |

```
DOC.DSEntry = {   706
    TimeStamp = 20070806101702;702
    DOCId = Client.Application.DSEntry.001;708
    DSId = cc_number_ltry;704
}
```

Figure 8

| | Attributes | Comments |
|---|---|---|
| 802 | Date and time | Date/Time stamp |
| 804 | Dialog State Id | Dialog State Id |
| 806 | Exit Type | Enumeration:<br>- Max timeout<br>- Max error<br>- Hang up<br>- Recognition achieved or TAG<br>- Max DTMF collected |
| 808 | Sequential | Successive iteration number |
| 810 | Prompt List | List of concatenate prompts to be played to the caller |
| 812 | Caller action | Enumeration:<br>- DTMF collected<br>- Recognition result |
| 814 | Recognition Confidence | Recognition Confidence |
| 816 | Platform Log | Address where to find the recognition log generated by the recognition platform. |

```
818
DOC.DSExit = {
    TimeStamp = 20070806101702; 802
    DOCId = Client.Application.DSExit.001; 820
    DSId = cc_number_ltry;804
    Sequencial = 1;808
    Prompt List =    "/machine/directory/prompts/p1.wav",
        810          "/machine/directory/prompts/p2.wav",
                     "/machine/directory/prompts/p3.wav";
    ExitType = RecognitionAchieved806
    Caller Action = "Recognition Result";812
    Recognition Confidence = 78; 814
    Platform Log = "/unix/directory/nuance/logs/today"; 816
}
```

Figure 9

| | Attributes | Comments |
|---|---|---|
| 902 | Date and time | Date/Time stamp |
| 904 | State ID | State Id |
| 906 | Data label | Identification of the data to be analyzed |
| 908 | Data value | Data value |
| 910 | Next State | Target state based on data value |

```
912
DOC.POD = {
    TimeStamp = 20070806101702;902
    DOCId = Client.Application.DSExit.001;914
    DSId = cc_number_ltry; 904
    Data Label = "Account Balance";906
908 Data Value = 0.00
    Next State = DOC.DSTransfer.034; 910
}
```

Figure 10

| Attributes | Comments |
|---|---|
| 1002 Date and time | Date/Time stamp |
| 1004 State ID | State Id |
| 1006 Transfer Destination | Type of destination<br>- operator<br>- application |
| 1008 Destination Address | Extension or phone number, or application id |

```
    1010
DOC.CallTxn = {
    TimeStamp = 20070806101702;1002
    DOCId = Client.Application.CaliTxn.001;1012
    Destination = OPERATOR;1006
    Destination Address = "1003246";  1008
}
```

Figure 11

| Attributes | Comments |
|---|---|
| Date and time | Date/Time stamp 1102 |
| State ID | State Id 1104 |

```
DOC.playMsgInit = {  1106
    TimeStamp = 20070806101702;1102
    DOCId = Client.Application.PlayMsgInit.001;1108
    DSId = cc_play_total_balance; 1104
}
```

Figure 12

| Attributes | | Comments |
|---|---|---|
| 1202 | Date and time | Date/Time stamp |
| 1204 | State ID | State Id |
| 1206 | Prompt List | List of concatenate prompts to be played to the caller |

```
    1208
DOC.PlayMsgExit= {
    TimeStamp = 20070806101702; 1202
    DOCId = Client.Application.PlayMsgExit.001; 1210
    DSId = cc_play_total_balance_0x;1204
    Prompt List =    "/machine/directory/prompts/p1.wav", 1206
                     "/machine/directory/prompts/p2.wav",
                     "/machine/directory/prompts/p3.wav";
}
```

Figure 13

| | Attributes | Comments |
|---|---|---|
| 1302 | Date and time | Date/Time stamp |
| 1304 | External entity type | Nature of the external entity or system<br>- database<br>- API<br>- Etc. |
| 1306 | External entity ID | Identification of the external system |
| 1308 | Submitted data | Data sent to the external entity |
| 1310 | Status | Returned status |
| 1312 | Value | Returned value |

```
1314
DOC.IntPoint= {
    TimeStamp = 20070806101702;1302
    DOCId = Client.Application.IntPoint.001;1316
    External System type = Database;1304
    External System ID = oracle.unixmachine.server:port]1306
    Submitted data = "SELECT amount_txn WHERE cust_id = '34324'";1308
    Status = QUERY_EXEC_OK;1310
    Value = 283.99 1312
}
```

Figure 14

| Attributes | Comments |
|---|---|
| 1402 Date and time | Date/Time stamp |
| 1404 Reason | Reason for disconnection |

```
      1406
DOC.CallTerm = {
    TimeStamp = 20070806101702;1402
    DOCId = Client.Application.CallTerm.001; 1408
    Reason = CALLER_HANG_UP; 1404
}
```

Figure 15

| Attributes | Comments |
|---|---|
| 1502 Date and time | Date/Time stamp |

```
1504
DOC.CallComp = {
    TimeStamp = 20070806101702;1502
    DOCId = Client.Application.CallComp.001;1506
}
```

INTERACTIVE VOICE RESPONSE DATA COLLECTION OBJECT FRAMEWORK, VERTICAL BENCHMARKING, AND BOOTSTRAPPING ENGINE

CROSS REFERENCE TO RELATED APPLICATIONS

The present application is related to commonly assigned U.S. patent application Ser. No. 12/028,082 entitled OPEN FRAMEWORK DEFINITION FOR SPEECH APPLICATION DESIGN filed on even date herewith, the entire contents of which are incorporated by reference herein.

FIELD OF THE DISCLOSURE

The present disclosure relates generally to an interactive voice response system. More particularly, the present disclosure provides a method, a system, and a computer readable medium comprising instructions for a data collection object framework for interactive voice response, and a vertical benchmarking and bootstrapping engine within such framework.

BACKGROUND OF THE DISCLOSURE

In today's environment, data from a speech application is logged in a variety of formats and is often difficult to retrieve for analysis. The process for retrieving and analyzing such data is lengthy and time-consuming. By the time the data is retrieved from the repository and analyzed, it is often outdated. Currently, analysts gather data from multiple sources and link them together within a database before analysis is performed. Even though data may be collected for a variety of industry verticals, it is often difficult to categorize data, identify critical key performances indices, or compare performance metrics in a cross-vertical and intra-vertical manner. Therefore, what is needed is a framework that provides the ability to collect data in a standardized manner, such that cross-vertical and intra-vertical data may be easily retrieved and analyzed.

SUMMARY OF THE DISCLOSURE

In one embodiment, a method for analyzing data of a speech application is provided. The method comprises defining a set of data collection objects for a call flow in a speech application, collecting data using the set of data collection objects during execution of the speech application, and analyzing the data using a benchmarking and bootstrapping engine, storing the data in a repository, and presenting the data for analysis.

In one embodiment, the set of objects comprise an application init interactive voice response data collection object (IDCO), a call init IDCO, a dialog state entry IDCO, a dialog state exit IDCO, a point of decision IDCO, a call transfer IDCO, a play message init IDCO, a play message exit IDCO, an integration point IDCO, a call termination IDCO, and a call completion IDCO. The shape and weight of each of the set of objects vary from one another based on the purpose of each object.

In another embodiment, a system for analyzing data of speech application is provided. The system comprises a data processing system accessible by at least one stakeholder involved in the speech application, a server comprising an interactive voice response data collection object framework for collecting and analyzing data during execution of the speech application, and a data repository for storing the data.

BRIEF DESCRIPTION OF THE DRAWINGS

FIG. 5 depicts a diagram illustrating attributes and an example of application init IDCO in accordance with one embodiment of the present disclosure;

FIG. 6 depicts a diagram illustrating attributes and an example of call init IDCO in accordance with one embodiment of the present disclosure;

FIG. 7 depicts a diagram illustrating attributes and an example of dialog state entry IDCO in accordance with one embodiment of the present disclosure;

FIG. 8 depicts a diagram illustrating attributes and an example of dialog state exit IDCO in accordance with one embodiment of the present disclosure;

FIG. 9 depicts a diagram illustrating attributes and an example of point of decision IDCO in accordance with one embodiment of the present disclosure;

FIG. 10 depicts a diagram illustrating attributes and an example of call transfer IDCO in accordance with one embodiment of the present disclosure;

FIG. 11 depicts a diagram illustrating attributes and an example of play message init IDCO in accordance with one embodiment of the present disclosure;

FIG. 12 depicts a diagram illustrating attributes and an example of play message exit IDCO in accordance with one embodiment of the present disclosure;

FIG. 13 depicts a diagram illustrating attributes and an example of integration point IDCO in accordance with one embodiment of the present disclosure;

FIG. 14 depicts a diagram illustrating attributes and an example of call termination IDCO in accordance with one embodiment of the present disclosure;

FIG. 15 depicts a diagram illustrating attributes and an example of call completion IDCO in accordance with one embodiment of the present disclosure;

DETAILED DESCRIPTION OF THE INVENTION

Figure 1:
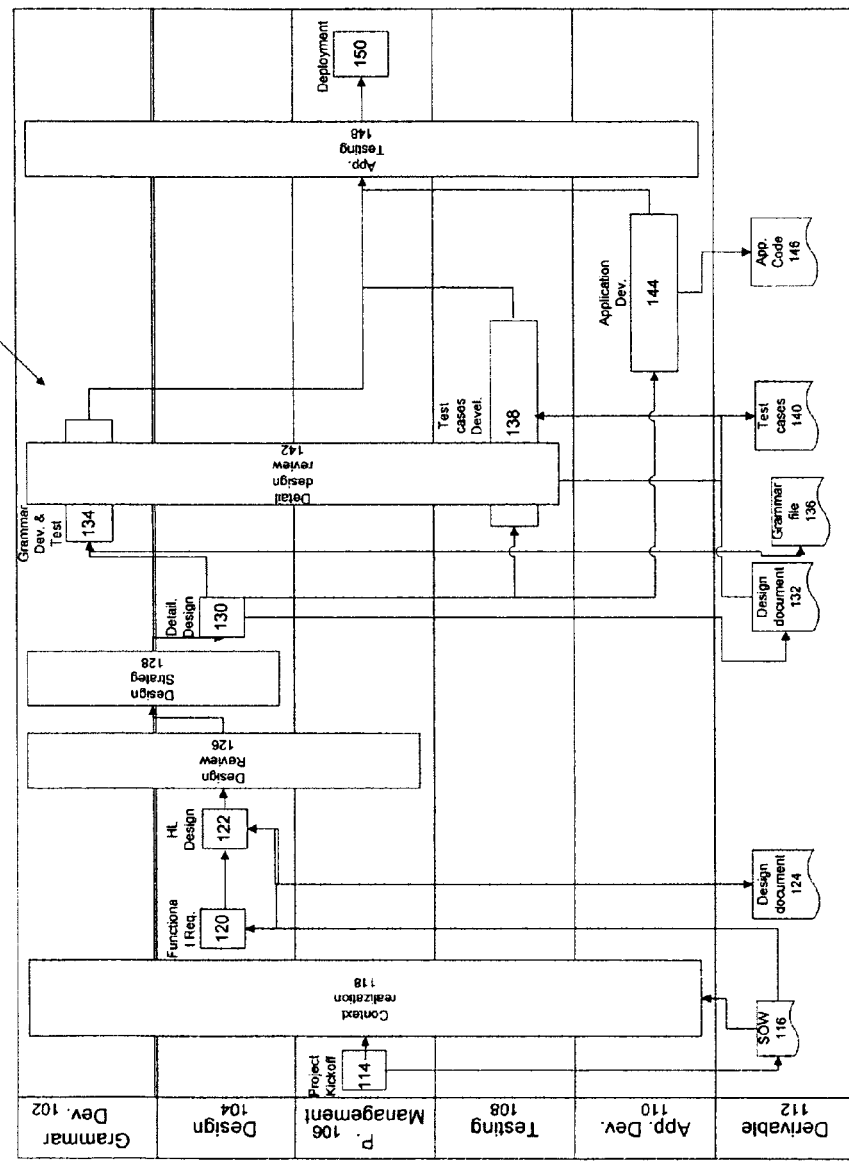
FIG. 1 depicts a diagram of current process for speech application design and development in accordance with an embodiment of the disclosure.

With reference to the figures and in particular with reference to FIG. 1, a diagram of current process for speech application design and development is depicted in accordance with an embodiment of the disclosure. In this exemplary design project, stakeholders involved include grammar developers 102, designers 104, project managers 106, testing analysts 108, and application developers 110. Each of the stakeholders may generate one or more derivable 112.

In this example, design process 100 begins when project managers 106 kicks off a project 114. The kickoff 114 generates a statement of work (SOW) 116 and the context of the project is then realized 118 through the SOW 116 to the stakeholders. The statement of work (SOW) 116 also helps designers 104 to generate functional requirements 120. With functional requirements 120, designers further develop a high level design 122 and design documents 124 reflecting the high level design 122.

A high level design review 126 is then conducted among project managers 106, designers 104, and grammar developers 102. During the review 126, designers 104 and grammar developers 102 select one or more design strategies 128. Based on the selected strategies, designers 104 develop a detailed design 130 and design documents 132. Grammar developers 102 then develop grammar and perform grammar testing 134 for the speech application based on the design documents 132. The developed grammar is stored in a grammar file 136. Also based on the design documents 132, testing analysts 108 develop various test cases 138 for the design and the developed test cases 140 are stored. At the time grammar and test cases are developed, a detailed design review 142 is conducted among testing analysts 108, project managers 106, designers 104, and grammar developers 102 to ensure that the developed grammar and test cases work with the detailed design as intended.

After detailed design review 142 is conducted and satisfactory results are achieved, application developers 110 develop the speech application 144 based on the detailed design 130 and application code 146 is generated by application developers 110. After the speech application is developed, application testing 148 is performed among application developers 110, testing analysts 108, project managers 106, designers 104, and grammar developers 102. To conduct application testing 148, the grammar file 136 and test cases 140 are used. If application testing 148 is successful, project managers 106 approve the speech application to be deployed 150.

In design process 100, each derivable 112 may be generated by different stakeholders and thus is independent from one another. For example, design documents 124 and 132 generated by designers 104 are independent from grammar file 136 and test cases 140, even though grammar file 136 and test cases 140 are generated based on information in design documents 124 and 132. Derivable of the next process step in process 100 cannot be generated from the derivable generated in the previous process step. This affects coordination and communication among the design team as well as sharing of work products that may affect later design process steps.

Aspects of the present disclosure provide an open framework definition for speech application design that define how elements of speech application design are presented for modification, storage, and interpretation, such that different stakeholders involved may interact with these elements throughout the entire design process. With this open framework, the time-to-market of the speech application is reduced. In addition, coordination and communication among the design team and sharing of information are improved, because derivable of one process step may be used to generate derivable of the next process step with these common design elements.

In one embodiment of the present disclosure, elements of speech application design may be divided into three main groups: data presentation elements, data repository elements, and data generate elements. Data presentation elements define information on how data is presented for modification, analysis, and use in a speech application design. Data repository elements define a structure in which data is stored. Data generation elements define how aggregated data and information are generated based on design elements at hand. Data generation elements enable next process step derivables to be generated from previous process step derivables.

Figure 2:
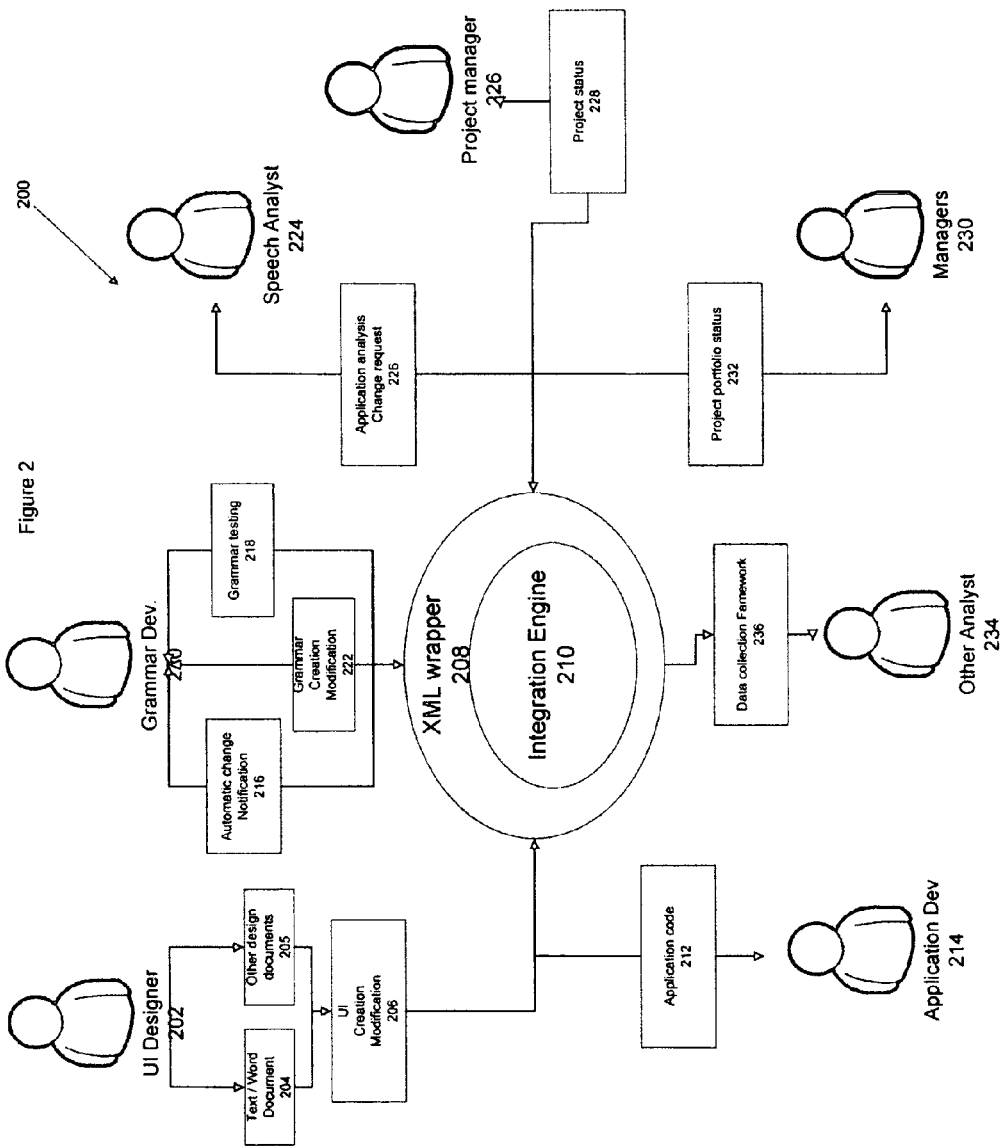
FIG. 2 depicts a diagram illustrating an exemplary architecture of the open framework for speech application design in accordance with one embodiment of the present disclosure.

Referring to FIG. 2, a diagram illustrating an exemplary architecture of the open framework for speech application design is depicted in accordance with one embodiment of the present disclosure. In open framework 200, stakeholders develop documents for their own portion of the design process using common design elements. For example, UI designer 202 developed the user interface in a text or Word document 204 or other design documents 205 and stores the document in a repository based on the structure defined in the data repository elements. The open framework 200 then takes the text or Word document 204 and generates a user interface creation modification document 206 using data presentation elements.

Because common design elements are defined in extensible markup language (XML) format, open framework 200 comprises an XML wrapper 208 for wrapping and unwrapping design elements provided by different stakeholders. Upon receiving the user interface creation modification document 206 in XML, XML wrapper 208 unwraps the information in the document. If other derivable can be generated from this document, open framework 200 provides an integration engine 210 that integrates the information and generates the derivable using data generation elements for the next process step. For example, based on the user interface creation modification document 206, application code 212 may be generated using the data generation elements in the integration engine 210. Once application code 212 is generated, the code may be wrapped in XML using the XML wrapper 208 and presented to the application developer 214.

Using common design elements, open framework 200 may provide automatic change notification 216 and grammar testing 218 to grammar developers 220. In turn, grammar developers 220 may create and modify the grammar using the grammar creation and modification document 222 provided by open framework 200 in XML format. Other stakeholders may also use common design elements to share their information and perform their tasks in the design process. For example, speech analysts 224 may receive an analysis of the speech application design and send a change request 226 to designers for modification. Also with common design elements, project managers 226 may communicate project status 228 with other stakeholders using common design elements, other managers 230 may monitor status of their project portfolios 232, and other analysts 234 may analyze collected data using data repository elements in the data collection framework 236.

In order to collect and analyze data collected from a variety of stakeholders or processes in open framework 200, one aspect of the present disclosure provides an interactive voice response data collection object framework 236 and vertical benchmarking and bootstrapping engine. The objective of IVR data collection object framework 236 is to collect and store data generated during execution of the speech application for later analysis. In addition, the framework 236 is capable to provide analysis even with continuous changes of business goals by clients of speech applications.

Figure 3:
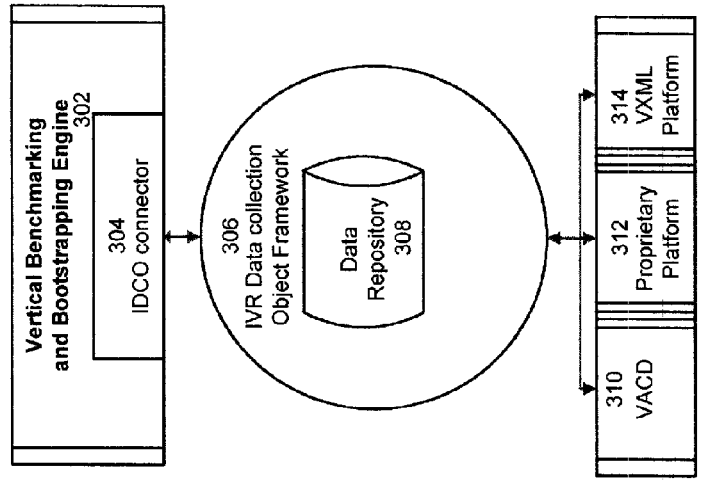
FIG. 3 depicts a diagram illustrating an exemplary architecture for the interactive voice response data collection object framework and vertical benchmarking and bootstrapping engine in accordance with one embodiment of the present disclosure.

Referring to FIG. 3, a diagram illustrating an exemplary architecture for the interactive voice response data collection object framework and vertical benchmarking and bootstrapping engine is depicted in accordance with one embodiment of the present disclosure. Vertical benchmarking and bootstrapping engine 302 is communicably coupled to integration engine 210 in FIG. 2 to collect data generated by speech application utilizing open framework 200. In this exemplary embodiment, vertical benchmarking and bootstrapping engine 302 comprises an IVR data collection connector 304 that communicates with an IVR data collection object framework 306 for storing and analyzing data.

In analyzing data, the vertical benchmarking and bootstrapping engine 302 uses bootstrapping techniques on the collected data to make predictions on the effectiveness of certain technology changes. In making predictions, vertical benchmarking and bootstrapping engine 302 discerns patterns within the collected data and make analysis on the patterns.

When collecting and analyzing data, the IVR data collection object framework 306 stores and retrieves the data in a data repository 308. The IVR data collection object framework 306 provides analysts and executives the ability to view and analyze data stored in data repository 308 based on key performance indices and other performance metrics in a cross-vertical and intra-vertical manner. In addition, IVR data collection object framework 306 presents the cross-vertical and intra-vertical data analysis to analysts and executives in a variety of formats. For example, the IVR data collection object framework 306 may present the analysis to analysts in a virtual automatic call distribution (VACD) platform, in a proprietary platform, or in a voice extensible markup language (VXML) platform.

Figure 4:
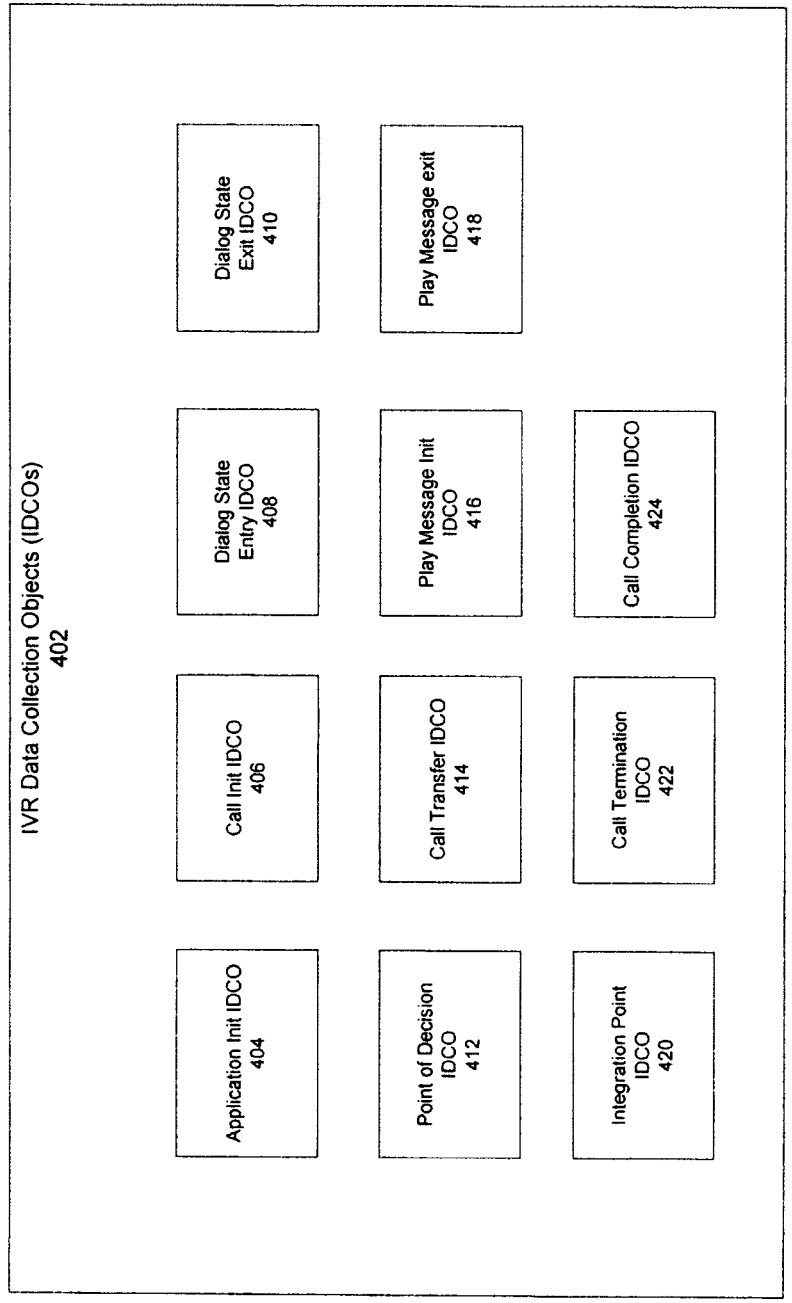
FIG. 4 depicts a diagram illustrating a set of IVR data collection objects in accordance with one embodiment of the present disclosure.

In order to provide a cross-vertical and intra-vertical analysis of collected data, IVR data collection object framework 306 comprises a set of IVR data collection objects that provide basic structures for collecting meaningful and complete data during execution of speech applications for later analysis. Each of IVR data collection objects varies in shape and weight based on the object's purpose. Referring to FIG. 4, a diagram illustrating a set of IVR data collection objects is depicted in accordance with one embodiment of the present disclosure.

In this exemplary embodiment, IVR data collection objects 402 comprise an application init IVR data collection object (IDCO). Application init IDCO 404 signals the initiation of the speech application. IVR data collection objects 402 also comprise a call init IDCO 406. Call init IDCO 406 signals the initiation of a particular call by a caller. IVR data collection objects 402 further comprise a dialog state entry IDCO 408. Dialog state entry IDCO 408 signals an initiation of a state of interaction between the speech application and the caller. This object only indicates that a dialog state is initiated.

IVR data collection objects 402 further comprise a dialog state exit IDCO 410. Dialog state exit IDCO 410 indicates the completion of a state of interaction between the speech application and the caller. In addition to indicating delivery of data such as informative prompts, menus, information pertinent to a specific dialog state, by the speech application, this object also indicates the caller's response or the lack thereof and how the specific dialog state handles the caller's response. For example, the specific dialog state may transition to another dialog state, another application or agent, or an end of application.

IVR data collection objects 402 further comprise a point of decision IDCO 412. Point of decision IDCO 412 indicates a bifurcation in the application flow based on the defined business rules. For example, a caller is being transferred to an agent because the customer's balance has reached a certain threshold and interaction with the speech application is denied as a result, a point of decision IDCO 412 may be used to indicate such a transfer.

IVR data collection objects 402 further comprise a call transfer IDCO 414. Call transfer IDCO 414 indicates that the current application no longer services the call. As a result, the call will be automatically transferred to another application or live operator for further treatment. IVR data collection objects 402 further comprise a play message init IDCO 416. Play message init IDCO 416 indicates the initiation of a state in which the application will provide caller with information but will not expect a response from the caller.

IVR data collection objects 402 further comprise a play message exit IDCO 418. Play message exit IDCO 418 indicates the completion of the state in which the application provides the caller with information. IVR data collection objects 402 further comprise an integration point IDCO 420. Integration point IDCO 420 indicates a point in the application in which the application is connecting to an external entity, for example, legacy systems or other databases, to perform operations that are pertinent and meaningful for control of the call flow.

IVR data collection objects 402 further comprise call termination IDCO 422. Call termination IDCO 422 indicates termination of the call and the reason for termination or reason for disconnecting one or more parties. IVR data collection objects 402 further comprise call completion IDCO 424. Call completion IDCO 424 indicates that a particular task which determines a call completion has been executed.

Referring to FIG. 5, a diagram illustrating attributes and an example of application init IDCO is depicted in accordance with one embodiment of the present disclosure. The attributes of an application init IDCO include date and time 502 of initiation of the application, server 504 on which the application is running, client identification 506 indicating name of the client, and application identification 508 indicating the name or the identification string for the application.

In this example, the identifier 512 of application init IDCO 510 is "Client.Application.ApInit.001". It has a time stamp 502 of "20070806101702". The server 504 on which the application is running on is identified by its Internet protocol address of "192.139.29.33". The name of the client 506 is "Client Name", and the name of the application 508 is "Main Menu".

Referring to FIG. 6, a diagram illustrating attributes and an example of call init IDCO is depicted in accordance with one embodiment of the present disclosure. The attributes of an call init IDCO include data and time 602 of the initiation of the call, server 604 on which the application is running, the line 606 from which the call came in, the application identification 608 indicating the name or the identification string for the application, an automatic name identifier (ANI) indicating the origination point identification number from which the call is originated, and a call identification for the call.

In this example, the identifier 616 of call init IDCO 614 is "Client.Application.CallInit.001". It has a time stamp 602 of "20070806101702". The server 604 on which the application is running on is identified by its Internet protocol address of "192.192.192.192". The line 606 from which the call came in is "34". The name of the application 608 is "Main Menu". The origination point identification ANI 610 is "402-555-3212", and the call identification 612 is "c.384302.aax.393".

Referring to FIG. 7, a diagram illustrating attributes and an example of dialog state entry IDCO is depicted in accordance with one embodiment of the present disclosure. The attributes of a dialog state entry IDCO include a date and time stamp 702 and a dialog state identification 704. In this example, dialog state entry IDCO 706 has an identifier 708 of "Client.Application.DSEntry.001". It has a time stamp 702 of "20070806101702" and a dialog state identification 704 of "cc_number_ltry".

Referring to FIG. 8, a diagram illustrating attributes and an example of dialog state exit IDCO is depicted in accordance with one embodiment of the present disclosure. The attributes of a dialog state exit IDCO include a date and time 802; a dialog state identifier 804; an exit type 806 which includes an enumeration of maximum time out, maximum error, hang up, recognition achieved, and maximum DTMF collected; a sequential 808 indicating a successive iteration number; a prompt list 810, which include a list of concatenate prompts to be played to the caller; a caller action 812, which includes a enumeration of DTMF collected or recognition result; recognition confidence 814; and a platform log 816, which indicates an address of where to find the recognition log generated by the recognition platform.

In this example, dialog state exit IDCO 818 has an identifier 820 of "Client.Application.DSExit.001" and a time stamp 802 of "20070806101702". The dialog state identifier 804 is "cc_number_ltry" and the sequential 808 is "1". Prompt list 810 comprises a list of prompts including "p1.wav", p2.wav", and "p3.wave" to be played to the caller. The exit type 806 is "recognitionAchieved" and the caller action 812 is "Recognition Result". The recognition confidence 814 is "78" and the platform log address 816 is "/unix/directory/nuance/logs/today".

Referring to FIG. 9, a diagram illustrating attributes and an example of point of decision IDCO is depicted in accordance with one embodiment of the present disclosure. The attributes of a point of decision IDCO include a date and time 902, a dialog state identifier 904, a data label 906 identifying data to be analyzed, a data value 908 identifying value of the data, and a next state 910 indicating a target state based on the data value 908.

In this example, point of decision IDCO 912 has an identifier 914 of "Client.Application.DSExit.001". The time stamp 902 is "20070806101702" and the dialog state identifier 904 is "cc_number_ltry". The data label 906 is "account balance" and the data value 908 is "0.00". The next state 910 is "DCO.DSTransfer.034", which means that the target state is dialog state transfer.

Referring to FIG. 10, a diagram illustrating attributes and an example of call transfer IDCO is depicted in accordance with one embodiment of the present disclosure. The attributes of a call transfer IDCO include a date and time 1002, a state identifier 1004, a transfer destination 1006, which indicates the type of transfer to either an operator or an application, and a destination address 1008, which may either be an extension or phone number of the operator or an application identification.

In this example, call transfer IDCO 1010 has an identifier 1012 of "Client.Application.CallTxn.001" and a time stamp 1002 of "20070806101702". The transfer destination 1006 is "operator" and the transfer destination address 1008 is "1003246".

Referring to FIG. 11, a diagram illustrating attributes and an example of play message init IDCO is depicted in accordance with one embodiment of the present disclosure. The attributes of a play message init IDCO include a date and time 1102 and a state identifier 1104. In this example, play message init IDCO 1106 has an identifier 1108 of "Client.Application.PlayMsgInit.001" and a time stamp 1102 of "20070806101702". The state identifier 1104 is "cc_play_total_balance".

Referring to FIG. 12, a diagram illustrating attributes and an example of play message exit IDCO is depicted in accordance with one embodiment of the present disclosure. The attributes of a play message exit IDCO include a date and time 1202 and a state identifier 1204. In addition, attributes include a prompt list 1206, which is a list of concatenate prompts to be played to the caller. In this example, play message exit IDCO 1208 has an identifier 1210 of "Client.Application.PlayMsgExit.001" and a time stamp 1202 of "20070806101702". The state identifier 1204 is "cc_play_total_balance". The list of prompts to be played to caller 1206 includes "p1.wav", "p2.wav", and "p3.wav".

Referring to FIG. 13, a diagram illustrating attributes and an example of integration point IDCO is depicted in accordance with one embodiment of the present disclosure. The attributes of a integration point IDCO include a date and time 1302; an external entity type 1304 indicating the nature of the external entity or system, including a database, an application programming interface (API); an external entity identifier 1306 identifying the external entity or system; submitted data 1308 indicating data sent to the external entity or system; a returned status 1310; and a returned value 1312.

In this example, integration point IDCO 1314 has a time stamp 1302 of "20070806101702" and an identifier 1316 of "Client.Application.IntPoint.001". The external entity type 1304 is a "database" and the external entity identifier 1306 is "oracle.unixmachine.server:port". The submitted data 1308 includes a query of "SELECT amount_txn_WHERE_custid='34324'. The returned status 1310 is "QUERY_EXEC_OK" and the returned value 1312 is "283.99". Thus, in this example, the integration point is a database and data is retrieved from the application to the database by sending a query for a value.

Referring to FIG. 14, a diagram illustrating attributes and an example of call termination IDCO is depicted in accordance with one embodiment of the present disclosure. The attributes of a call termination IDCO include a date and time 1402 and a reason 1404 for disconnection. In this example, call termination IDCO 1406 has an identifier 1408 of "Client.Application.CallTerm.001" and a time stamp 1402 of "20070806101702". The reason 1404 for disconnection is "CALLER_HANG_UP".

Referring to FIG. 15, a diagram illustrating attributes and an example of call completion IDCO is depicted in accordance with one embodiment of the present disclosure. The attributes of a call completion IDCO include a date and time 1502. In this example, call completion IDCO 1504 has an identifier 1506 of "Client.Application.CallComp.001" and a time stamp 1502 of "20070806101702".

Figure 16:
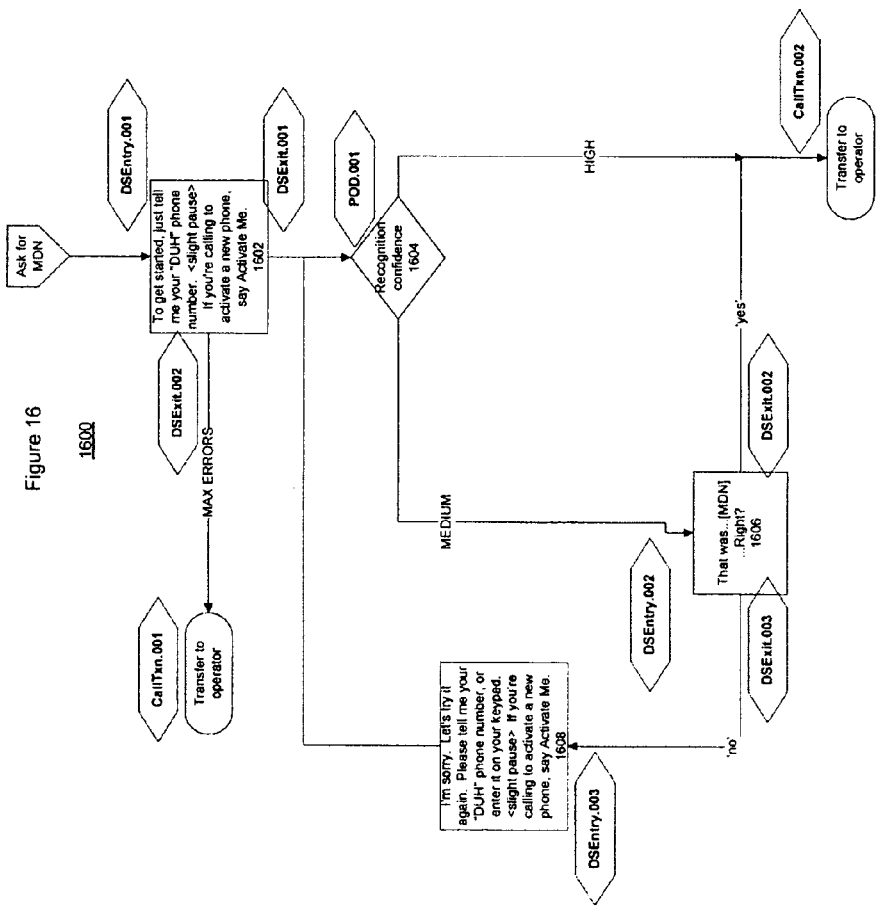
FIG. 16 depicts a diagram illustrating an exemplary call flow of a speech application with IVR data collection objects in accordance with one embodiment of the present disclosure.

Referring to FIG. 16, a diagram illustrating an exemplary call flow of a speech application with IVR data collection objects is depicted in accordance with one embodiment of the present disclosure. Call flow 1600 enters dialog state entry IDCO DSEntry.001 and the caller is prompted to say either a phone number or activate a new phone at step 1602. If the caller's response is recognized by the speech application, dialog state exit IDCO DSExit.001 defines how to handle such response and exits the caller to a different dialog state. But if the caller's response is not recognized by the speech application, dialog state exit IDCO DSExit.002 defines the maximum number of errors the caller may make before the caller is exited from the speech application. If the caller reached the maximum number of errors, call flow 1600 transfers the caller to an operator in a manner defined in call transfer IDCO CallTxn.001.

If the caller is recognized, call flow 1600 enters a point of decision at step 1604 to determine the recognition confidence of the caller's response. The point of decision is represented by point of decision IDCO POD.001, which defines the data to be analyzed and the target state of the call based on the data value.

If the recognition confidence is high, call flow 1600 transfers the caller to an operator in a manner defined in call transfer IDCO CallTxn.002. If the recognition confidence is medium, call flow 1600 enters a dialog state entry IDCO DSEntry.002 and the caller is prompted to repeat the response to the caller and to respond whether the recognized response is correct at step 1606.

If the recognized response is correct, dialog state exit IDCO DSExit.002 defines how the caller is exited if recognition is achieved. In this case, the caller is transferred to operator in a manner defined in call transfer IDCO CallTxn.002. But if the recognized response is incorrect, dialog state exit IDCO DSExit.003 defines how the caller is exited if recognition is not achieved. In this case, call flow 1600 enters a dialog state entry IDCO DSEntry.003 and the caller is prompted to restate the phone number or "activate me" or enter the phone number on the keypad at step 1608. Call flow 1600 then returns to point of decision IDCO POD.001 to determine recognition confidence.

Figure 17:
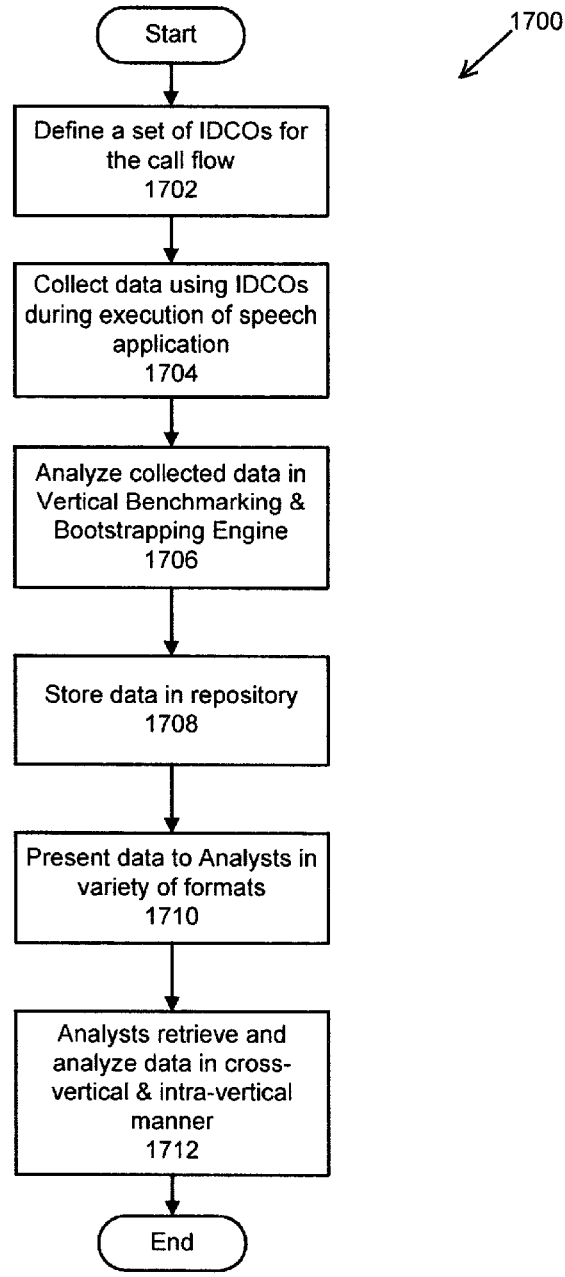
FIG. 17 depicts a flowchart of a process for collecting and analyzing data from a speech application in accordance with one embodiment of the present disclosure.

Referring to FIG. 17, a flowchart of a process for collecting and analyzing data from a speech application is depicted in accordance with one embodiment of the present disclosure. In this example, process 1700 may be implemented as computer readable medium comprising instructions executing within IVR data collection object framework 306. Process 1700 begins at step 1702 to define a set of interactive voice response data collection objects for a call flow in a speech application.

Next, process 1700 continues to step 1704 to collect data using defined IDCOs during execution of the call flow in the speech application. Process 1700 then continues to analyze collected data in the vertical benchmarking and bootstrapping engine. For example, data patterns of the collected data may be analyzed. Process 1700 then continues to step 1708 to store the collected and analyzed data in a repository. Process 1700 then continues to step 1710 to present the data to analysts and executives in a variety of formats, for example, VXML or other proprietary formats. Process 1700 completes at step 1712 when the analysts and executives retrieve the data and analyze the data in a cross-vertical and intra-vertical manner.

Figure 18:
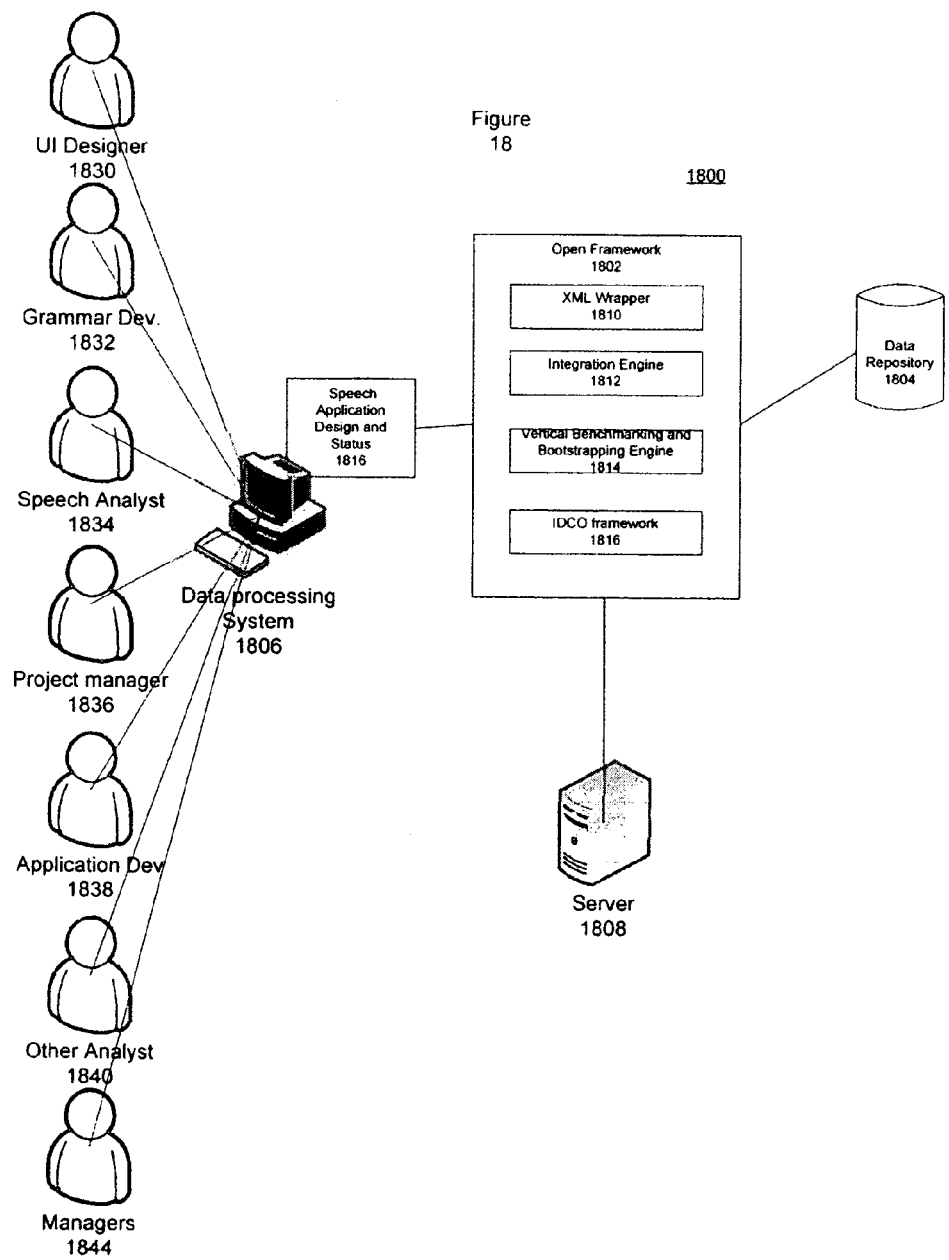
FIG. 18 depicts a diagram of a system for IVR data collection object framework and vertical benchmarking and bootstrapping engine in accordance with one embodiment of the present disclosure.

Referring to FIG. 18, a diagram of a system for IVR data collection object framework and vertical benchmarking and bootstrapping engine is depicted in accordance with one embodiment of the present disclosure. System 1800 comprises an open framework 1802, a data repository 1804, data processing system 1806 through which different stakeholders communicate with the open framework 1802.

In one embodiment, open framework 1802 may be implemented in a computer readable medium comprising instructions executing within a server 1808. Systems 1806 and 1808 may be a data processing system, such as a desktop computer, a laptop computer, a server or any other type of device capable of sending and receive information via a wired or wireless protocol. The transfer of information or data between data processing system 1806, server 1808, and data repository 1804 may be accomplished via at least one of a wireless protocol, a wired protocol and a combination of a wireless protocol and a wired protocol. The steps performed in this figure are performed by software, hardware, firmware, and/or the combination of software, hardware, and/or firmware.

Open framework 1802 comprises an XML wrapper for wrapping and unwrapping design elements provided by different stakeholders. These stakeholders include user interface designer 1830, grammar developer 1832, speech analyst 1834, project manager 1836, application developer 1838, other analysts 840, and other managers 1842. In addition, open framework 1802 comprises an integration engine 1812 that integrates information provided by these stakeholders and generates derivables or speech application design and status 1816 using design elements.

Open framework 1802 further comprises a vertical benchmarking and bootstrapping engine 1814 that communicates with integration engine 1812 for collecting data during execution of speech application. Vertical benchmarking and bootstrapping engine 1814 also performs analysis on the collected data based on the IDCOs defined in the IDCO framework 1816 and stores the data in data repository 1804. IDCO framework 1816 presents the data from the data repository to analysts and executives, such as other analysts 1840 and managers 1844, for cross-vertical and intra-vertical analysis.

In summary, the present disclosure provides an interactive voice response data collection object framework and benchmarking and bootstrapping engine for collecting and analyzing data from a speech application. The set of objects are defined based on their purposes and collected data may be presented to analysts and executives in a variety of formats to perform intra-vertical and cross-vertical analysis. Based on the presented data, analysts and executives may categorize data, identify critical key performance indices, and compare performance metrics in a cross-vertical and intra-vertical manner. In addition, by providing a common set of data collection objects for the speech application, different stakeholders may analyze the data even with continuous changing business requirements.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:
1. A computer-implemented method, comprising:
a computer defining a set of interactive voice response data collection objects (IDCO) for a call flow in a speech application, wherein the set comprises a plurality of types of IDCO, each type of IDCO indicating at least one of a type of interaction and indicating a processing action on collected data;
the computer instantiating a first dialog state entry IDCO for a first call from a first caller, the first call processed by an interactive voice response (IVR) system;
the computer instantiating a first dialog state exit IDCO upon a recognition by the computer of a first response by the first caller to a first request provided by the computer;
the computer instantiating a first point of decision IDCO to determine a recognition confidence level for the first response;
the computer instantiating a second dialog state entry IDCO for the first call based on the computer determining a medium recognition confidence level for the first response;
the computer one of positively confirming the first response with the first caller, instantiating a second dialog state exit IDCO, and transferring the first call to an operator in a manner defined in a first call transfer IDCO and not positively confirming the first response with the first caller and instantiating a third dialog state exit IDCO;

the computer, based on not positively confirming the first response, instantiating a third dialog state entry IDCO, providing a second request, and receiving a second response; and the computer returning the first call to the first point of decision IDCO to determine a recognition confidence level for the second response; and the computer collecting data using the IDCOs during execution of the speech application wherein the computer uses a benchmarking and bootstrapping engine to apply bootstrapping techniques on the collected data and make predictions on the effectiveness of technology changes.

2. The computer-implemented method of claim 1, further comprising:

the computer instantiating a first dialog state entry IDCO for a call from a second caller, the call processed by an interactive voice response system;

the computer instantiating a first dialog state exit IDCO for the call from the second caller upon recognition by the computer of a first response by the second caller to a first request provided by the computer to the second caller;

the computer instantiating a second point of decision IDCO to determine a recognition confidence level for the first response from the second caller; and the computer transferring the call to the operator in a manner defined in a second call transfer IDCO based on the computer determining a high recognition confidence level to the first response by the second caller.

3. The computer-implemented method of claim 1, further comprising:

the computer instantiating a first dialog state entry IDCO for a call from a third caller, the call processed by an interactive voice response system; and the computer transferring the call to an operator in a manner defined in a third call transfer IDCO based on non-recognition by the computer of a predetermined quantity of responses by the third caller to a first request provided by the computer to the third caller, the predetermined quantity defined in a first dialog state exit IDCO for the call.

4. The computer-implemented method of claim 1, further comprising the computer analyzing the data using the benchmarking and bootstrapping engine comprising:

responsive to collecting the data, the computer discerning patterns within the data and analyzing the patterns.

5. The computer-implemented method of claim 1, wherein the benchmarking and bootstrapping engine is communicably coupled to an integration engine to collect the data generated by the speech application.

6. The computer-implemented method of claim 1, further comprising computer presenting the data for analysis comprising:
the computer retrieving the data from a repository; and
the computer presenting the data in at least one format to at least one analyst.

7. The computer-implemented method of claim 6, wherein the at least one format comprises a voice extensible markup language format and a proprietary format.

8. The computer-implemented method of claim 1, wherein the data comprises key performance indices and other performance metrics across a number of verticals.

9. The computer-implemented method of claim 1, wherein the set of data collection objects additionally comprises an application init interactive voice response data collection object (IDCO), a call init IDCO, a play message init IDCO, a play message exit IDCO, an integration point IDCO, a call termination IDCO, and a call completion IDCO.

10. The computer-implemented method of claim 9, wherein the application init IDCO signals an initiation of the speech application, and comprises a date and time, a server on which the speech application is running, a client identification, and an application identification.

11. The computer-implemented method of claim 9, wherein the call init IDCO signals an initiation of a particular call, and comprises a date and time, a server on which the speech application is running, a line from which the call came in, an application identification, a call origination point identification number, and a call identification.

12. The computer-implemented method of claim 9, wherein the dialog state entry IDCO signals an initiation of a state of interaction between a caller and the speech application, and comprises a date and time and a dialog state identification.

13. The computer-implemented method of claim 9, wherein the dialog state exit IDCO signals a completion of a state of interaction between a caller and the speech application, delivery of data by the speech application and the caller's response, and how the state should respond to the caller's response.

14. The computer-implemented method of claim 13, wherein the dialog state exit IDCO comprises a date and time, a dialog state identification, an exit type, a sequential, a list of prompts to be played to a caller, a caller action, a recognition confidence, and a platform log.

15. The computer-implemented method of claim 9, wherein the point of decision IDCO signals a bifurcation in the call flow based on defined business rules, and comprises a date and time, a state identification, a data label, a data value, and a next state.

16. The computer-implemented method of claim 10, wherein the call transfer IDCO signals that the speech application no longer services a call, and comprises a date and time, a state identification, a transfer destination, and a destination address.

17. The computer-implemented method of claim 11, wherein the play message init IDCO signals an initiation of a state in which the speech application will provide a caller with information but does not expect a response from the caller.

18. The computer-implemented method of claim 9, wherein the play message exit IDCO signals a completion of a state in which the application provides a caller with information, and comprises a date and time, a state identification, and a list of prompts to be played to a caller.

19. The computer-implemented method of claim 9, wherein the integration point IDCO signals a point in the speech application in which the application connects to an external entity to perform operations pertinent to control of the call flow.

20. The computer-implemented method of claim 19, wherein the integration point IDCO comprises a date and time, an external entity identification, submitted data, a returned status, and a returned value.

21. The computer-implemented method of claim 9, wherein the call termination IDCO signals termination of a call and a reason for termination.

22. The computer-implemented method of claim 9, wherein the call completion IDCO signals an execution of a particular task that determines completion of a call.

23. A system, comprising:
a computer; and an application, that, when executed on the processor:
  defines a set of interactive voice response data collection objects (IDCO) for a call flow in a speech application, wherein the set comprises a plurality of types of IDCO, each type of IDCO indicating at least one of a type of interaction and indicating a processing action on collected data;
  instantiates a first dialog state entry IDCO for a first call from a first caller, the first call processed by an interactive voice response (IVR) system;
  instantiates a first dialog state exit IDCO upon a recognition by the system of a first response by the first caller to a first request provided by the system;
  instantiates a first point of decision IDCO to determine a recognition confidence level for the first response;
  instantiates a second dialog state entry IDCO for the first call based on the system determining a medium recognition confidence level for the first response;
  one of positively confirms the first response with the first caller, instantiates a second dialog state exit IDCO, and transfers the first call to an operator in a manner defined in a first call transfer IDCO and not positively confirms the first response with the first caller and instantiates a third dialog state exit IDCO;
  based on not positively confirming the first response, instantiates a third dialog state entry IDCO, provides a second request, and receives a second response;
  returns the first call to the first point of decision IDCO to determine a recognition confidence level for the second response;
  collects data using the IDCOs during execution of the speech application; and
  uses a benchmarking and bootstrapping engine to apply bootstrapping techniques on the collected data and make predictions on the effectiveness of technology changes.

24. The system of claim 23, wherein the benchmarking and bootstrapping engine analyzes the data using the IDCOs.

25. A non-transitory computer readable storage medium comprising instructions that, when executed by a computer perform:
  defining a set of interactive voice response data collection objects (IDCO) for a call flow in a speech application, wherein the set comprises a plurality of types of IDCO, each type of IDCO indicating at least one of a type of interaction and indicating a processing action on collected data;
  instantiating a first dialog state entry IDCO for a first call from a first caller, the first call processed by an interactive voice response (IVR) system;
  instantiating a first dialog state exit IDCO upon a recognition of a first response by the first caller to a first request;
  instantiating a first point of decision IDCO to determine a recognition confidence level for the first response;
  instantiating a second dialog state entry IDCO for the first call based on determining a medium recognition confidence level for the first response;
  one of positively confirming the first response with the first caller, instantiating a second dialog state exit IDCO, and transferring the first call to an operator in a manner defined in a first call transfer IDCO and not positively confirming the first response with the first caller and instantiating a third dialog state exit IDCO;
  based on not positively confirming the first response, instantiating a third dialog state entry IDCO, providing a second request, and receiving a second response;
  returning the first call to the first point of decision IDCO to determine a recognition confidence level for the second response;
collecting data using the IDCOs during execution of the speech application; and
  using a benchmarking and bootstrapping engine to apply bootstrapping techniques on the collected data and make predictions on the effectiveness of technology changes.

* * * * *